United States Patent
Zumbach et al.

[15] 3,673,447
[45] June 27, 1972

[54] COMMUTATOR COOLING MEANS

[72] Inventors: Bruno Zumbach, Grunemattstrasse 8, CH-2552, Orpund-Biel; Heinz Zumbach, Bartolomausweg 16, CH-2500, Biel, both of Switzerland

[22] Filed: Aug. 20, 1968

[21] Appl. No.: 760,382

[30] Foreign Application Priority Data

Aug. 24, 1967 Switzerland ..................... 11907/67

[52] U.S. Cl. ............................................. 310/227, 310/89
[51] Int. Cl. ........................................................ H02k 9/28
[58] Field of Search ..................... 310/54, 58, 59, 60, 61, 64, 310/227, 57, 89

[56] References Cited

UNITED STATES PATENTS

| | | | |
|---|---|---|---|
| 3,233,130 | 2/1966 | Bates | 310/89 X |
| 3,365,597 | 1/1968 | Hanyu | 310/89 |
| 2,662,195 | 12/1953 | Fisher et al. | 310/59 |
| 3,073,976 | 1/1963 | Wesolowski | 310/227 X |

FOREIGN PATENTS OR APPLICATIONS 1,160,476   3/1958   France

Primary Examiner—D. F. Duggan

[57] ABSTRACT

An electric machine having a rotor winding connected to a collector or to slip rings and brushes contacting said collector or slip rings, said collector or slip rings and brushes being capsuled in a supporting structure for the one bearing of the machine and the brushes, axial cooling-air ducts being formed in said structure for admitting cooling air to the windings of the machine.

8 Claims, 4 Drawing Figures

COMMUTATOR COOLING MEANS ELECTRICAL MACHINE

This invention relates to an electrical machine having brushes or slip rings arranged in a capsule enclosing the armature between the brushes and the armature winding and having air inlets at its outer portion. Such machines are known and have the advantage, that protection of the brushes and slip rings or collector and an effective ventilation of the armature and stator winding is possible.

In known machines of this kind a cylindrical capsule connected to the bearing flange encloses the slip rings or collector and brushholders and brushes. The disadvantage of this construction is, that the brushes and collector or slip rings are only accessible by removing the bearing flange. This is particularly unfavorable with large machines where the brushholders are mounted on a brush bridge. Cylindric capsules have no surfaces suitable for fitting brushes terminals or similar auxiliary devices. It is the aim of this invention to eliminate said disadvantages. The machine according to this invention comprises a yoke ring, an armature including an armature winding and rotatably mounted within said yoke ring, bearing means for said armature and brushes contacting rotatable conductor means connected to said armature winding, a supporting structure for said brushes and one of said bearing means adjacent said rotatable conductor means, said structure comprising a radial bearing flange wherein said one bearing means is mounted, a second radial flange parallel to said bearing flange and having a central opening closely mating a portion of said armature between said conductor means and said armature winding, said flanges being interconnected by axially extending webs of channel - shaped sections and open at their outer side, said flanges having apertures where interconnected with said webs such that air ducts are formed through said apertures and webs respectively, and a mantle removably attached to said flanges and covering the space between said flanges, said supporting structure being connected to said yoke ring and forming together with said mantle a capsule enclosing said brushes and rotatable conductor means. Openings remain between said webs, through which the brushes are directly accessible. Nevertheless the whole space is tightly encapsuled when said mantle is mounted, and the winding space of the stator and armature is ventilated through said air ducts formed by said webs. These webs may preferably have a flat inner surface whereon auxiliary devices like terminals or the like may be fixed.

The bearing flange may be preferably closed by means of a special cover. This cover may be provided with a leading-in for cables and may be fixed in different angular positions, so that the cable leading-in may be positioned at different places of the machine periphery. In the drawing an embodiment of a machine according to this invention is illustrated by way of example.

Figure 1:
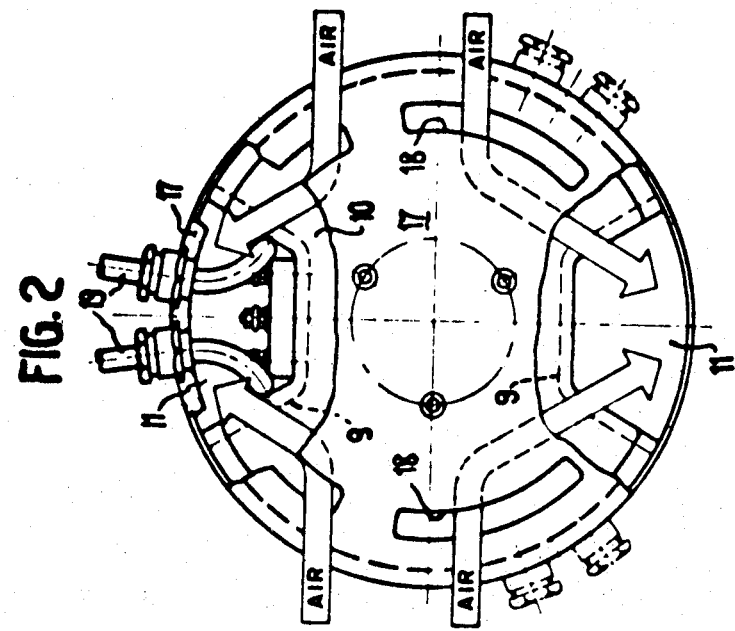
FIG. 1 shows a longitudinal section through the machine part, which is essential for the invention.

The illustrated DC-machine has a yoke ring 1 with pole shoes 2, an exiting winding 3 and an armature 4 with collector 5. The winding heads between the armature lamination and collector 5 are not covered with a usual bandage, which has only approximative rotation symmetry, but coated with an accurately formed sealing compound 6.

Figure 2:
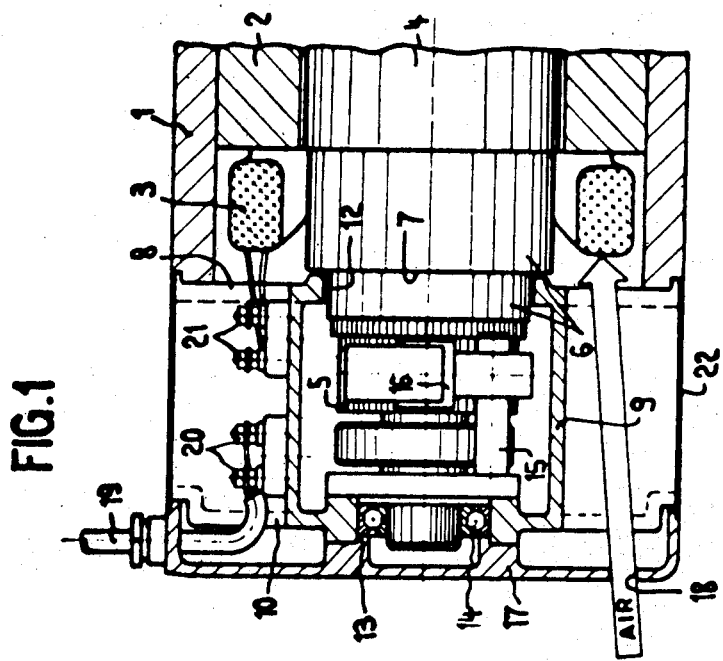
FIG. 2 shows a front view of the machine, partly in section.
Figure 3:
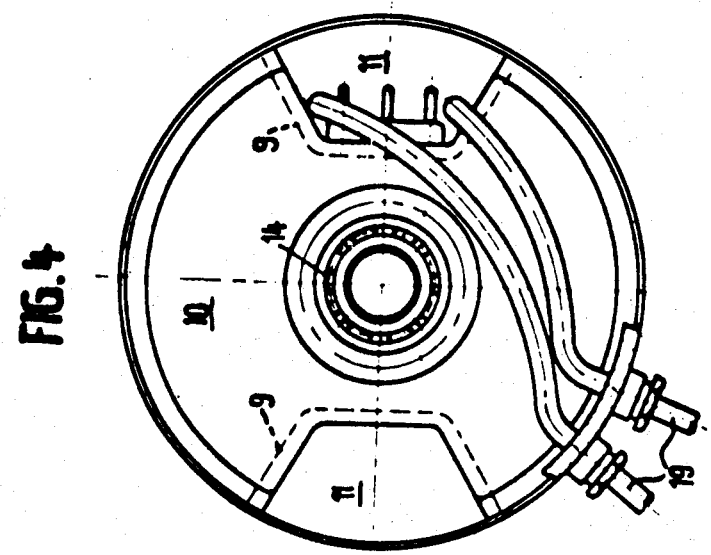
FIG. 3 shows a top view of the essential part, partly in section.
Figure 4:
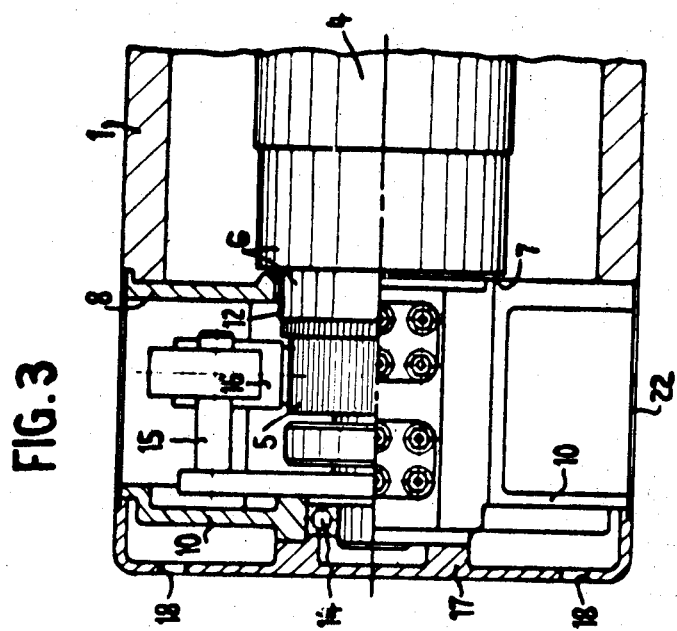
FIG. 4 shows a front view of the machine with removed cover.

This sealing compound forms a step 7 by which it is separated into a portion of smaller diameter near the collector and a portion of larger diameter near the lamination of the rotor. A flange 8 of a supporting structure is fixed to yoke ring 1 and is interconnected with a flange 10 by webs as shown in FIGS. 2 and 4. The webs are of channel-shaped section opened to the outer side, and the flanges 8 and 10 have apertures 11 where interconnected with said webs. The flange 8 is provided with a bore 12 inside the webs 9, into which engages the portion of smaller diameter of the sealing compound 6. The outer surface of flange 8 with bore 12 mates with small clearance the step 7 of the sealing compound. In this way a kind of labyrinth joint is formed, that means, that air exchange is practically eliminated and dust or similar contaminations are prevented from entering to the collector 5 through bore 12. The flange 10 has a bore 13 receiving the one armature bearing 14. The brush bridges 15 and brush holders 16 are fixed to the inner side of flange 10. A cover plate 17 is screwed to flange 10, which also forms a cover for bearing 14.

The cover plate 17 has ventilation gaps 18 through which air can flow into the space formed between cover plate 17 and flange 10 as indicated in FIG. 1.

The axial flange of the cover plate 17 is provided with leading-in's for cables 19. The cables are connected to a terminal block mounted in a groove formed by one of the webs 9. Further terminals in the same groove serve to connect the exiting winding 3 and the brushes. Between the axial flange of the cover plate 17 and the flange 8 and the yoke ring respectively a cylindric closed thin mantle 22 is attached which can easily be removed by unlocking of a lock not shown. Said mantle closely mates the circular parts of flanges 8 and 10 and the outer edges of bars 9 so that the space between the bars 9 containing the collector and brushes is practically tightly encapsuled. On the other hand communication between the ambient air and the winding space is provided through the ventilation gaps 18 in the cover plate 17, the ring space enclosed between cover plate 17 and flange 10 and through the grooves formed in webs 9 forming ventilating ducts together with the mantle 22. Along the above described path air may enter into the winding space as indicated by arrows in FIG. 1 and 2 without entering the collector space. Ventilation is obtained in the usual way by means of a fan — not shown — at the rear side of the armature. The particular advantages of the described machine are set out in above description. The brushes and collector are completely encapsuled and thus protected from detrimental influences.

In case the machine is designed for relatively high voltages and there is danger of leaking currents in the area of the terminals 20, 21, the latter may be covered with a special insulating cover.

Similar embodiments for instance for slip-ring motors are possible. In the described two-pole machine two webs 9 are preferably provided. However, it is possible to provide another supporting structure for larger multipole machines with a number of webs according to the number of poles. Three webs may be used in a three-phase collector machine. One web only may be provided for slip-ring machines where brushes are fixed in only one place.

What we claim is:

1. An electric machine comprising a yoke ring, an armature including an armature winding and rotatably mounted within said yoke ring, bearing means for said armature and brushes contacting rotatable conductor means connected to said armature winding, a supporting structure for said brushes and one of said bearing means adjacent said rotatable conductor means, said structure comprising a radial bearing flange wherein said one bearing means is mounted, a second radial flange parallel to said bearing flange and having a central opening closely mating a portion of said armature between said conductor means and said armature winding, said flanges being interconnected by axially extending webs of channel - shaped sections and open at their outer side, said flanges having apertures where interconnected with said webs such that air ducts are formed through said apertures and webs respectively, and a mantle removably attached to said flanges and covering the space between said flanges, said supporting structure being connected to said yoke ring and forming together with said mantle a capsule enclosing said brushes and rotatable conductor means.

2. A machine according to claim 1, comprising sealing compound covering winding heads of said armature, said sealing compound having a smooth and concentric surface inside said second flange.

3. A machine according to claim 2, wherein said sealing compound has a step, whereby the said second flange closely mates the step both at its axial and radial surface.

4. A machine according to claim 1 comprising a cover plate having ventilation gaps and being attached to said bearing flange.

5. A machine according to claim 4 wherein said cover plate is a bearing cover.

6. A machine according to claim 4 wherein said cover plate has an axial flange with an aperture for passage of cables.

7. A machine according to claim 6 wherein said cover plate is adapted to be attached in different angular positions in order to determine the position of the cable.

8. A machine according to claim 1 comprising terminal blocks at the outside and brush holders at its inner side of said webs, said mantle covering said terminal blocks.

* * * * *